United States Patent
Bahadur et al.

(10) Patent No.: US 10,884,710 B1
(45) Date of Patent: Jan. 5, 2021

(54) SYSTEM AND METHOD FOR GENERATING UNIFIED EXPERIENCES ON DIGITAL PLATFORMS

(71) Applicant: Accenture Global Solutions Limited, Dublin (IE)

(72) Inventors: Badrinath Bahadur, Pune (IN); Marin Grace Mercylawrence, Bangalore (IN); Parikshit Maniar, Bangalore (IN); Shridhar Rajgopalan, Bangalore (IN)

(73) Assignee: Accenture Global Solutions Limited, Dublin (IE)

(*) Notice: Subject to any disclaimer, the term of this patent is extended or adjusted under 35 U.S.C. 154(b) by 0 days.

(21) Appl. No.: 16/539,623

(22) Filed: Aug. 13, 2019

(51) Int. Cl.
*G06F 8/34* (2018.01)
*G06F 8/20* (2018.01)
*G06N 3/08* (2006.01)
*G06F 8/61* (2018.01)

(52) U.S. Cl.
CPC ............... *G06F 8/34* (2013.01); *G06F 8/20* (2013.01); *G06N 3/08* (2013.01); *G06F 8/64* (2013.01)

(58) Field of Classification Search
None
See application file for complete search history.

(56) References Cited

U.S. PATENT DOCUMENTS

| | | | |
|---|---|---|---|
| 6,829,063 B1* | 12/2004 | Allebach | H04N 1/52 358/3.13 |
| 9,135,752 B2* | 9/2015 | Kutaragi | G06T 19/006 |
| 10,186,061 B1* | 1/2019 | Boxer | A63F 13/60 |
| 2016/0054985 A1* | 2/2016 | Cragun | G06F 11/36 715/762 |
| 2018/0004487 A1* | 1/2018 | Hill | G06F 8/20 |
| 2019/0042743 A1* | 2/2019 | Chen | G06F 21/563 |
| 2019/0122103 A1* | 4/2019 | Gao | G06K 9/6273 |
| 2019/0188525 A1* | 6/2019 | Choi | G06K 9/628 |
| 2019/0197729 A1* | 6/2019 | Liang | G06N 3/08 |
| 2019/0317739 A1* | 10/2019 | Turek | G06N 3/0454 |
| 2020/0151088 A1* | 5/2020 | Gu | G06F 5/06 |
| 2020/0175314 A1* | 6/2020 | Fang | G06K 9/623 |

* cited by examiner

*Primary Examiner* — Daxin Wu
(74) *Attorney, Agent, or Firm* — Plumsea Law Group, LLC

(57) ABSTRACT

A system and method for intelligently and automatically generating deployable code for target platforms and frameworks based on images or other graphical inputs is disclosed. The system and method leverage artificial intelligence to automatically identify and classify elements of a design as feature patterns. Identification is performed using convolutional neural networks, while classification is done using a Softmax classifier. The intelligent system can then automatically generate code for target platforms and frameworks that reproduce the feature patterns. Target platforms may include web platforms, mobile platforms (such as mobile phones), wearable platforms (such as smart watches), and extended reality platforms (which includes augmented reality (AR), virtual reality (VR), and/or combinations of AR/VR).

20 Claims, 7 Drawing Sheets

| TILEMAP | 1 | 2 | 3.. | X.. | Y.. | N.. |
|---|---|---|---|---|---|---|
| ROW 1 | ☐ | ~~FIR~~ | ~~FIRST~~ | ~~FIRST NA~~ | FIRST NAME | LAST NAME |
| CLASSIFICATION (PROBABILITY) | BACKGROUND | LABEL (DISCARD) | LABEL (SELECT) | LABEL (DISCARD) | LABEL (SELECT) | LABEL (SELECT) |
| BACKGROUND | 0.93 | 0.01 | 0.01 | 0.01 | 0.01 | 0.01 |
| LABEL | 0.002 | 0.6 | 0.7 | 0.6 | 0.95 | 0.95 |
| INPUT TEXT | 0.004 | 0.002 | 0.002 | 0.002 | 0.002 | 0.002 |
| CHECKBOX | 0.006 | 0.004 | 0.004 | 0.004 | 0.004 | 0.004 |

FIRST NAME | LAST NAME
EMAIL
OFFICE | MOBILE
(___) ___-____ | (___) ___-____

ADDRESS LINE 1

ADDRESS LINE 2 (OPTIONAL) | ZIP

CITY | STATE
 | SELECT

TERMS AND CONDITIONS AGREEMENT

☐ CHECK HERE TO INDICATE THAT YOU HAVE READ AND ACCEPT THE TERMS AND CONDITIONS

FIG. 6

SYSTEM AND METHOD FOR GENERATING UNIFIED EXPERIENCES ON DIGITAL PLATFORMS

TECHNICAL FIELD

The present disclosure generally relates to experiences on digital platforms. More specifically, the disclosure relates to an intelligent platform for generating experiences on digital platforms.

BACKGROUND

A digital experience is any interaction between a user and an organization that is implemented through a digital technology. Companies building software and applications for digital devices often attempt to create a unified digital experience across different digital channels, different applications and different types of devices. Typically, digital experiences are initially created by designers using design tools. The designs are then passed to engineers who specialize in creating code for specific platforms (mobile, web, wearables, AR/VR, etc.) and/or specific software frameworks (Angular, React, Swift, etc.).

Designers may use a variety of different experience design tools, such as Photoshop, Figma, etc. There are currently no unified approaches to converting the outputs from these design tools into deployable code for given choices of platform and framework. There is thus a significant amount of work required to translate the designs into executable code for target platforms and frameworks. In some cases, up to fifty percent of the development effort for a given experience may be spent working on user interface layouts. As the market moves towards full stack developers who prefer working on business logic rather than layouts, there is an even greater need to increase the efficiency of translating designs into deployable code.

There is a need in the art for a system and method that addresses, at least, the shortcomings discussed above.

SUMMARY

An intelligent experience generation system and method is disclosed. The intelligent experience generation system and method solves the problems discussed above by automating the process of generating deployable code that implements a digital experience for target platforms and frameworks based on input designs. Specifically, the system can automatically convert wireframes and other graphical designs for digital experiences (e.g., websites, mobile applications, wearable experiences and VR/AR experiences) into deployable code that implements those digital experiences on a variety of different platforms and for a variety of different frameworks. The system improves on existing low code platforms that allow designers to build a user interface with pre-defined widgets by enabling a 1-1 mapping from input designs to output digital experiences that are not constrained by the available widgets. The system can also take images and/or portable document formatted files (PDFs) as input, rather than customized design file types, thereby allowing the system to incorporate designs from any design tool.

The system may convert wireframe and/or other visual designs into target platform and framework code according to the following process: (1) render designs on a canvas; (2) recursively traverse the canvas and read the design pixels; (3) analyze the pixel maps and recommend indicative patterns; (4) transform identified patterns according to target platform standards; (5) transform platform patterns according to target framework standards; (6) enhance the patterns according to best industry practices; (7) display finalized patterns for users; (8) apply accessibility and disability guidelines; (9); generate output files; (10) apply test scaffolding; (11) output target platform and framework code along with test case scripts.

As part of this process, the system may use artificial intelligence to identify and then classify elements from the input designs. Specifically, identification may be performed using a convolutional neural network (CNN) and the classification may be performed using a Softmax classifier for multi-class classification. Once the system has identified and classified the elements, the code to produce these elements can be automatically generated according to known rules for a target platform and for a target framework. The resulting output can then be tested by users who can provide feedback to help train the system or otherwise iterate on the output.

In one aspect, a method for automatically generating code to be executed on a target digital platform includes steps of: (1) receiving a design image; (2) rendering the design image on a digital canvas and reading pixels of the design image; (3) automatically generating a tile map from the pixels of the design image upon reading the design image; (4) using a neural network to identify a feature pattern in the tile map; (5) classifying the feature pattern in the tile map; and (6) using the classified feature pattern to automatically generate code, wherein the code reproduces the feature pattern in the tile map on the target platform.

In another aspect, a system for automatically generating code to be executed on a target digital platform includes a device processor, and a non-transitory computer readable medium storing instructions that are executable by the device processor to implement: (1) a canvas rendering engine that renders an input design image on a digital canvas; (2) a design parser that reads pixels in the design image and parses the pixels into tile sets; (3) a pattern identification and classification module that can convert the tile sets into tile maps, further comprising a neural network that identifies feature patterns in the tile maps and a classifier that classifies the feature patterns identified by the neural network; (4) a platform pattern transformation module that transforms the identified feature patterns into platform specific programming objects; and (5) an output generator that outputs deployable code for the target digital platform, wherein the code reproduces the feature patterns on the target platform.

In another aspect, a non-transitory computer-readable medium storing software includes instructions executable by one or more computers which, upon such execution, cause the one or more computers to: (1) receive a design image; (2) render the design image on a digital canvas and read pixels of the design image; (3) automatically generate a tile map from the pixels of the design image upon reading the design image; (4) use a neural network to identify a feature pattern in the tile map; (5) classify the feature pattern in the tile map; and (6) use the classified feature pattern to automatically generate code, wherein the code reproduces the feature pattern in the tile map on the target platform.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 5 is a schematic view of a table representing feature patterns that have been identified and classified, according to an embodiment;

FIG. 6 is a schematic view of an output of the process of FIG. 3 that can be used to facilitate feedback, according to an embodiment.

DESCRIPTION OF EMBODIMENTS

A system and method for intelligently and automatically generating deployable code that implements digital experiences for target platforms and frameworks based on images or other graphical inputs is disclosed. The digital experiences can include graphics, inputs (such as menus and forms), and other elements associated with software applications running on various digital platforms. The system and method leverage artificial intelligence to automatically identify and classify elements of a design as feature patterns. The intelligent system can then automatically generate code for target platforms and frameworks that reproduce the feature patterns and thereby implement a digital experience for the users. Target platforms may include web platforms, mobile platforms (such as mobile applications/browsers), wearable platforms (such as smart watches), and extended reality platforms (which includes augmented reality (AR), virtual reality (VR), and/or combinations of AR/VR). The code may also be automatically generated for use with target frameworks. Target frameworks can include, for example, server-side web frameworks such as Ruby on Rails and Django, and client-side web frameworks such as Angular and React, or mobile application frameworks such as Android SDK or Swift.

Figure 1:
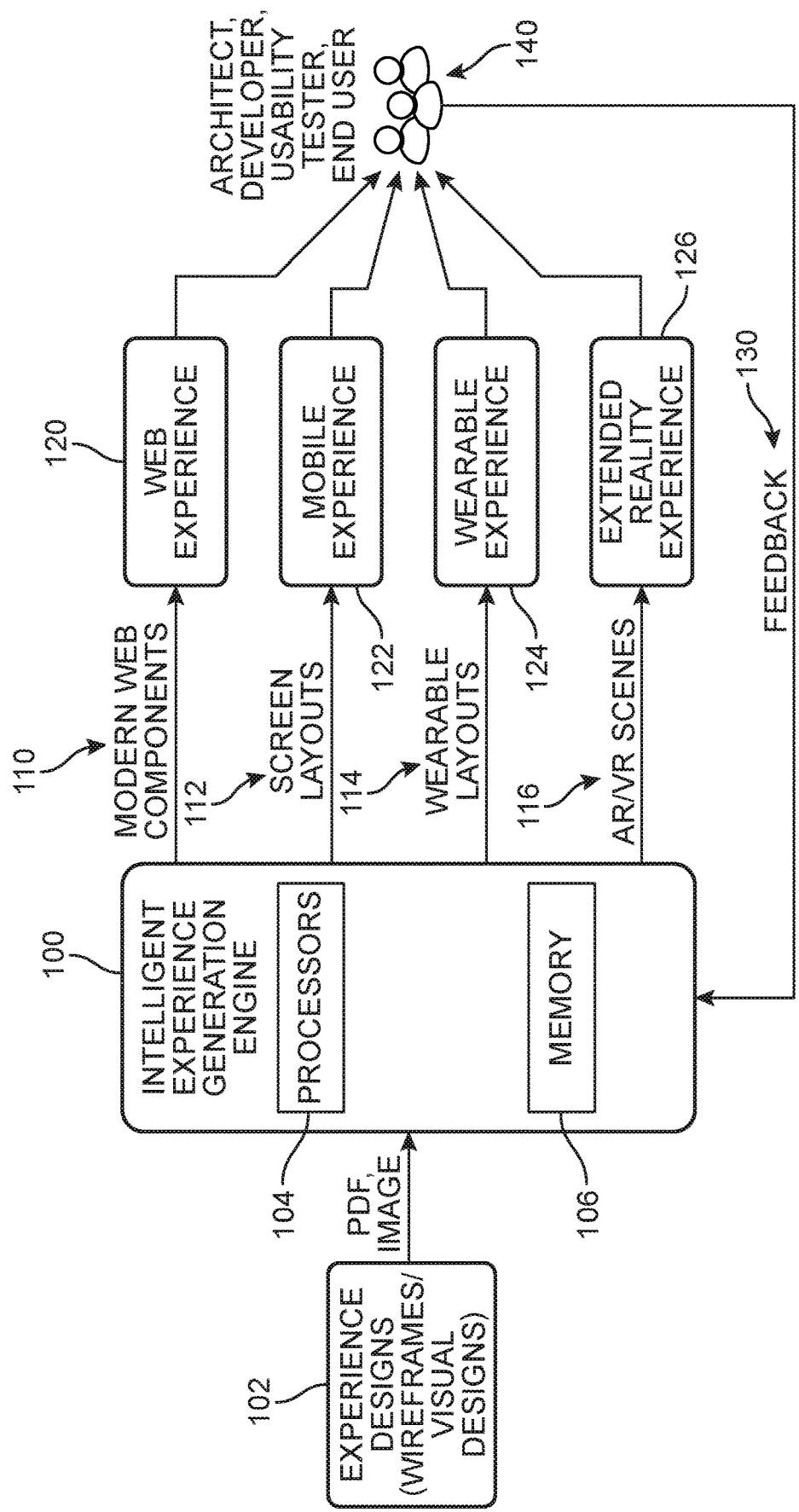
FIG. 1 is a schematic view of the inputs and outputs of an intelligent experience generation engine, according to an embodiment.

FIG. 1 is a schematic view of a system for automatically converting experience designs into deployable code that can be run on a variety of platforms. The deployable code implements a digital experience on the target platform that corresponds to the experience design. Specifically, experience designs 102 are fed as inputs into an intelligent experience generation engine 100. Experience designs 102 may comprise any outputs of a design tool or other graphical interface. For example, experience designs 102 could comprise wireframes or other visual designs. The format of the experience designs could be any image based or graphical based format, such as JPEG, SVG, PDF, PNG or GIF. Other format types include formats associated with specific design tools, such as the adobe photoshop format or the adobe illustrator format. In the exemplary embodiment, experience designs may be PDFs or other image files. However, in some cases, intelligent experience generation engine 100 could include provisions for converting files in other formats (such as the adobe photoshop format) into PDF or image files (such as JPEG).

Intelligent experience generation engine 100, also referred to simply as engine 100, takes the PDF or image files for an experience design and outputs code that can be deployed across multiple different target platforms so as to provide a variety of different digital experiences associated with the experience design. For example, engine 100 may output modern web components 110 (such as HTML files, JavaScript files, and/or various web framework components) that can be used to implement a web experience 120. Also, engine 100 may output screen layouts 112 (such as responsive layouts or native android/ios screen layouts that are important for mobile design) that can be used to implement a mobile experience 122. Also, engine 100 may output wearable layouts 114 (which are generally highly constrained in size as compared to mobile and web layouts) that can be used as part of a wearable experience 124. Also, engine 100 may output AR/VR scenes 116 that can be used as part of an extended reality experience 126.

Each of these experiences may be consumed by software architects, software developers, usability testers, and/or end users 140. Some of these people may participate in a feedback cycle. This feedback cycle is used to provide feedback 130 to intelligent experience generation engine 100 to refine the pattern recognition abilities of the system.

Engine 100 may be configured with one or more processors 104 and memory 106. Memory 106 may comprise a non-transitory computer readable medium. Instructions stored within memory 106 may be executed by the one or more processors 104. More specifically, memory 106 may store software modules and other software components, as well as data, which facilitates translating experience designs into deployable code that implements digital experiences.

Figure 2:
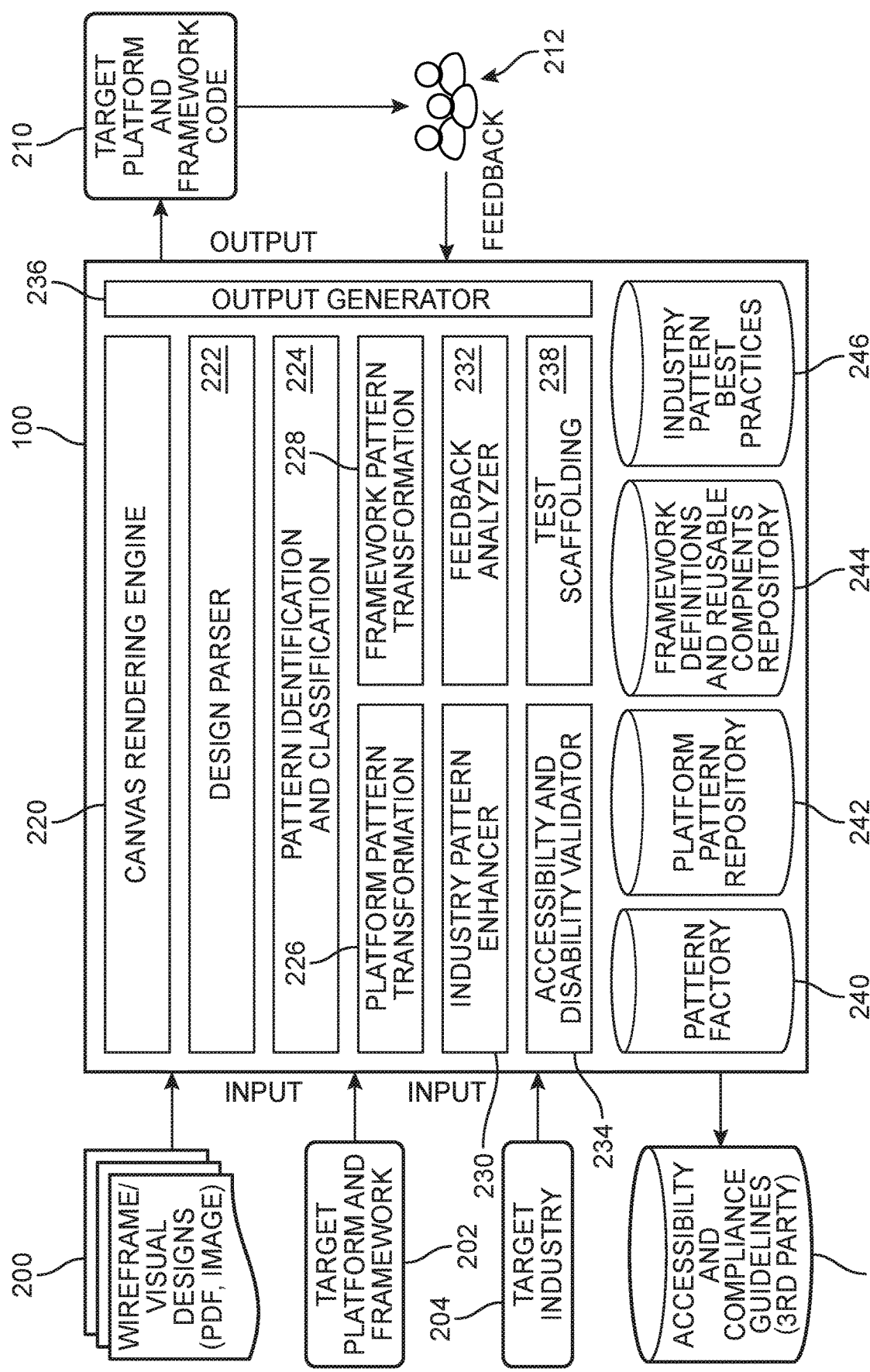
FIG. 2 is a schematic view of some components of an intelligent experience generation engine, according to an embodiment.

FIG. 2 is a schematic view of an architecture for intelligent experience generation engine 100, according to one embodiment. As already discussed, engine 100 may receive input including designs 200. Additionally, engine 100 receives information about the target platform and framework 202. Optionally, engine 100 may receive information about the target industry 204, which may inform how the designs are translated into digital experiences. Moreover, in some cases, engine 100 may be in communication with an external component that may be consulted for accessibility and compliance guidelines 206.

Engine 100 automatically generates output 210. The output is comprised of code that is specific to a selected target platform and framework. In some cases, engine 100 may generate code for multiple different platform and framework combinations. Output 210 is then used to generate experiences for users 212 who can, optionally, provide feedback.

Engine 100 may be comprised of a plurality of different components. These may include software modules for performing particular operations, as well as data storage components (for example, databases). For example, engine 100 can include a canvas rendering engine 220, a design parser 222, a pattern identification and classification module 224, a platform pattern transformation module 226, a framework pattern transformation module 228, an industry pattern enhancer 230, a feedback analyzer 232, an accessibility and disability validator 234, an output generator 236, and a test scaffolding module 238. Additionally, engine 100 may include various data storage systems, such as a pattern factory 240, a platform pattern repository 242, a framework components repository 244, and an industry pattern best practices store 246. Each component may be configured with one or more sub-modules or sub-components that facilitate converting the input into deployable code, as described in further detail below.

Figure 3:
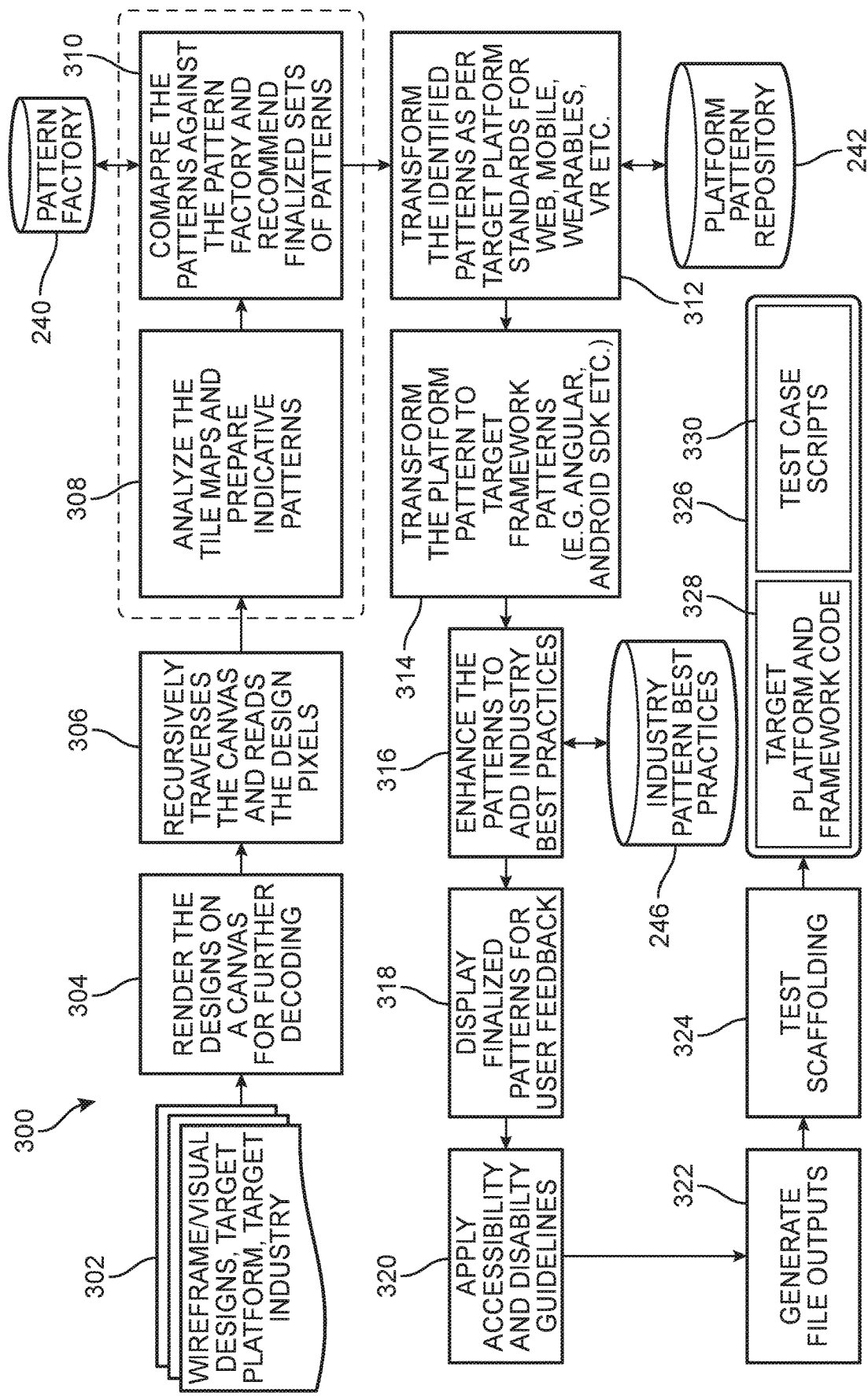
FIG. 3 is a schematic view of a process for transforming visual designs into target platform and framework code, according to an embodiment.

FIG. 3 is a schematic view of a process 300 for automatically converting input designs into code that can be deployed on a target platform and for a target framework to implement a digital experience. Some of these steps may be performed by one or more of the modules or components described above and shown in FIG. 2.

The exemplary process starts with inputs 302. These may include wireframe and/or other visual designs, the target platform(s) and/or framework(s), as well as the target industry. Based on this input data, engine 100 may render the designs on a canvas for further decoding in step 304. Specifically, using canvas rendering engine 220, engine 100 may receive command line inputs from the user and convert the inputs into configuration objects with details for: sources files associated with the experience design, the output destination for the code, target platforms, target frameworks, and a target industry (if applicable). Canvas rendering engine 220 may then make a network call to any associated cloud interfaces to retrieve the image files and any necessary rulesets to be distributed to other components of engine 100. Canvas rendering engine 220 may further read in source image files and prepare an image object and any metadata based on the dimensions and resolutions of the design images. Canvas rendering engine 220 may also read in any PDF files and parse those files to extract an image object and any metadata. The source files can then be iterated over and one or more HTML canvases can be constructed using a headless browser controller in a browser. The design images may then be rendered in the canvas.

Once the canvases have been created, engine 100 may recursively traverse each canvas and read in the pixels from the design images in step 306. This step may be performed by design parser 222. Specifically, design parser 222 may parse each image object in the canvas into individual pixel elements. Then, design parser 222 may create a tile set by iterating through each pixel using 2D traversal. Here, each "tile" in the tile set may be comprised of a group of pixels having a predefined set of rows and columns. The size of the tile sets could be set according to the desired degree of granularity and accuracy. Once the tile sets have been prepared, design parser 222 may assemble the individual tiles into a 2D array that represents the original design image.

After the tile sets for each image have been created, engine 100 may analyze the tile sets to identify and classify portions of the image in step 308. Specifically, pattern identification and classification module 224 receives a 2D array of the tile set assembled by design parser 222. Using rulesets that have been previously retrieved, module 224 iterates through the tile set to create multiple tile maps. A tile map (or "pixel map") may correspond to one or more tiles that have been grouped together. Once a set of tile maps have been created, module 224 can analyze each tile map to identify feature patterns. The term "feature pattern" refers to a pattern in an image that can be associated with an element of a design. Thus, a feature pattern may indicate that a given tile map contains a title, an input label, an input box, a menu selector, a photo, or any other element of a design.

In some embodiments, feature patterns may be identified using a deep neural network (DNN). The DNN may comprise different kinds of layers including convolutional layers, pooling layers, and/or fully connected layers. In one embodiment, the DNN may comprise at least one convolutional layer that feeds into at least one pooling layer. Additionally, the at least one pooling layer could feed into a series of two or more fully connected layers.

Once module 224 has identified different feature patterns, those features can be classified as in step 310. In some cases, classification can be performed using a Softmax classifier. The Softmax classifier takes an identified feature pattern and provides probabilities that the feature pattern belongs to a set of known classes. In some cases, the classifier may compare the selected feature pattern with sample/known patterns from pattern factory 240.

Figure 4:
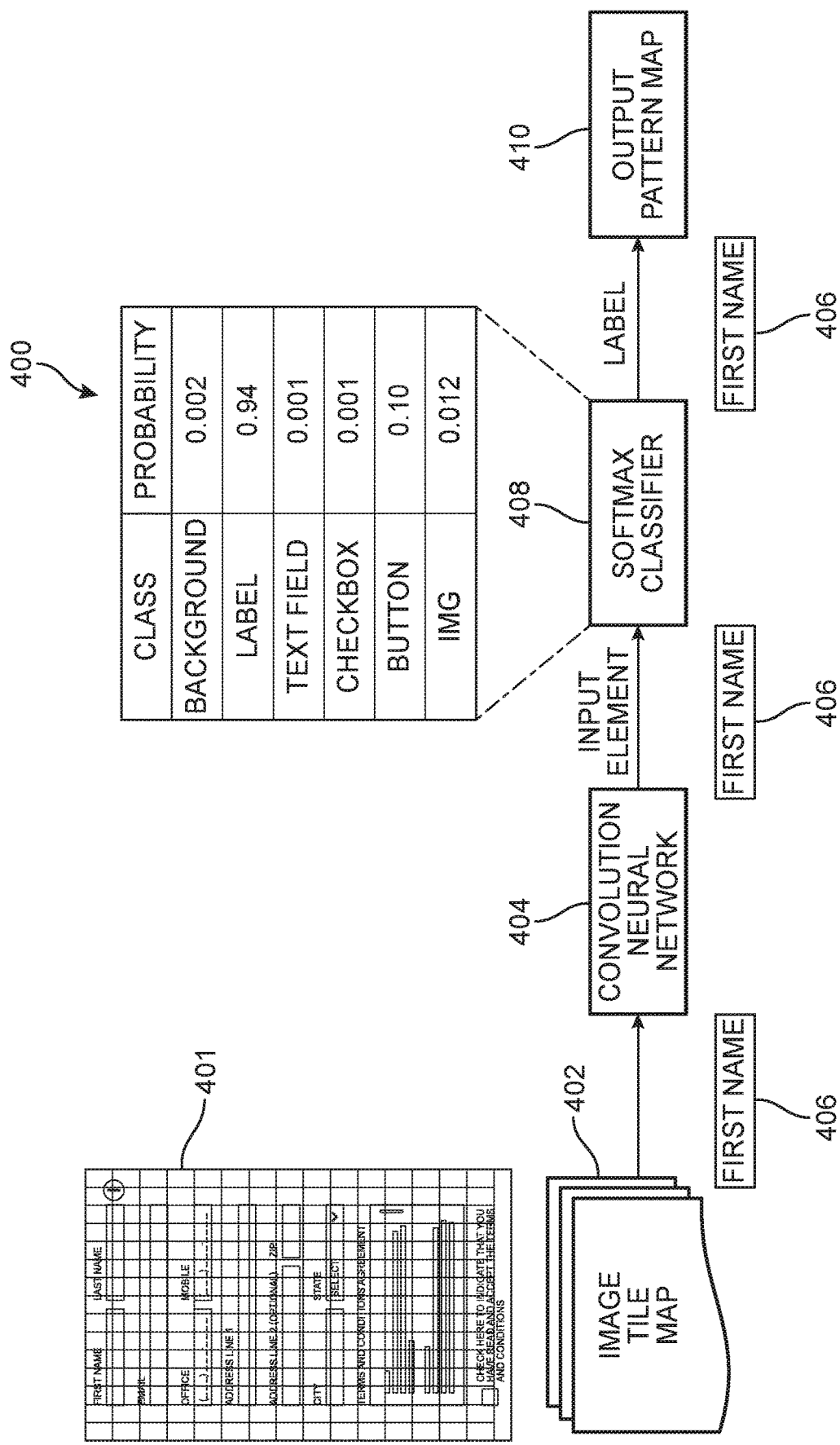
FIG. 4 is a schematic view of a process for identifying and classifying a feature pattern, according to an embodiment.

In order to better illustrate the feature identification and classification process, FIG. 4 depicts a schematic view of a process 400 that may be performed by module 224. As seen in FIG. 4, module 224 receives a tile set 401 and constructs an associated set of tile maps, which may correspond to groups of tile sets. Each image tile map 402 is then analyzed by a convolutional neural network 404. As described above, the convolutional neural network may also incorporate pooling layers as well as fully connected layers as part of its architecture.

As an example, a tile map 406 is provided as input to CNN 404. CNN 404 identifies tile map 406 as an "input element". Softmax classifier 408 may receive both tile map 406 and the "input element" identifier. Based on this information, classifier 408 compares tile map 406 with known sample input elements and estimates a probability that tile map 406 corresponds to a particular type of UI element. For example, classifier 408 gives a high probability (0.94 or 94%) to tile map 406 being a "label" (for an input element). Based on this classification, tile map 406 is identified with an output pattern map 410 that will be used to automatically generate code.

The table 500 shown in FIG. 5 further illustrates how tile maps can be identified and classified. For example, in row 1 of the table in FIG. 5, several different tile maps are presented. In this example tile map 2 is a fragment of an actual design element. Specifically, tile map 502 namely part of the first name label on a web form. By contrast, tile map 504 corresponds to the complete label "first name", and tile map 506 corresponds to the complete label "last name." Having been identified by the neural network, the feature pattern of each tile map is then classified by the classifier. The probabilities for each feature pattern are given in the bottom four rows of the table. For example, tile map 501, which is identified as a "background" element, has a 93% probability of being a background element, according to the classifier. Likewise, tile map 504 and tile map 506 each have a 95% probability of being labels. Therefore, tile map 504 and tile map 506 are selected (that is, retained for further processing). By contrast, tile map 502 has only a 60% chance of being a label, and no more than a 10% chance of being any other known element. Therefore, element 502 is discarded by the engine and not used to generate elements in later steps.

Referring back to FIG. 3, after generating a finalized set of patterns (via identification and classification) in step 308 and step 310, engine 100 may transform the identified patterns into the appropriate coding elements for the target platform in step 312. Specifically, platform pattern transformation module 226 may transform feature patterns into core elements for a target platform. Here, a "core element" refers to a class, object, or other programming element used to generate a particular digital element in a given platform. For example, if the identified pattern is an input text element, the associated core element for a web platform would be the HTML element "<input type='text'>". In some cases, the core elements for each pattern can be retrieved from platform pattern repository 242.

In step 314, engine 100 may transform the platform pattern to target framework patterns. Specifically, framework pattern transformation module 228 may convert the platform specific core elements identified in step 312 into framework specific elements for the target platform. For example, HTML, CSS and JavaScript code could be reorganized (or transformed) into standard framework components that implement the digital experience using known rules and strategies.

In step 316, the framework specific patterns can be enhanced according to best practices that may be industry specific. Specifically, industry pattern enhancer 230 may retrieve best practices from industry best practices storage 246. These best practices may provide guidance for implementing the framework patterns so that the resulting code is in compliance with security standards, aesthetic standards, and/or any other kinds of standards associated with a particular industry.

In step 318, engine 100 may display the finalized patterns for user feedback. As an example, FIG. 6 illustrates a sample output. In this output, experience elements are superimposed over the original design image 600 so that a user can easily see how well the automatically generated digital experience matches the experience design. For clarity, only some digital experience elements are shown.

As an example, design image 600 includes a first design box 604 (for inputting a first name) and a second design box 608 (for inputting a last name). In this case, first input box 602 is overlaid onto first design box 604. As can be seen, first input box 602 does not have the correct size or alignment to match first design box 604. By contrast, second input box 606 substantially matches second experience box 608. Thus, a user reviewing the output of step 318 may provide feedback that indicates that first input box 602 is incorrect. The system may then iterate over the design until this error is corrected.

Referring back to the process in FIG. 3, in step 320, engine 100 may apply accessibility and disability guidelines. Specifically, accessibility and disability validator 234 may iterate through the elements of the output to ensure compliance with accessibility and disability guidelines. In some cases, as part of this step, validator 234 may consult accessibility and compliance guidelines 206 (shown in FIG. 2).

In step 322 output files can be generated. In step 324 the system may also output test scaffolding files that can be used to test the automatically generated code against various templates. The outputs 326 may therefore include both target platform and framework code 328, as well as test case scripts 330.

Figure 7:
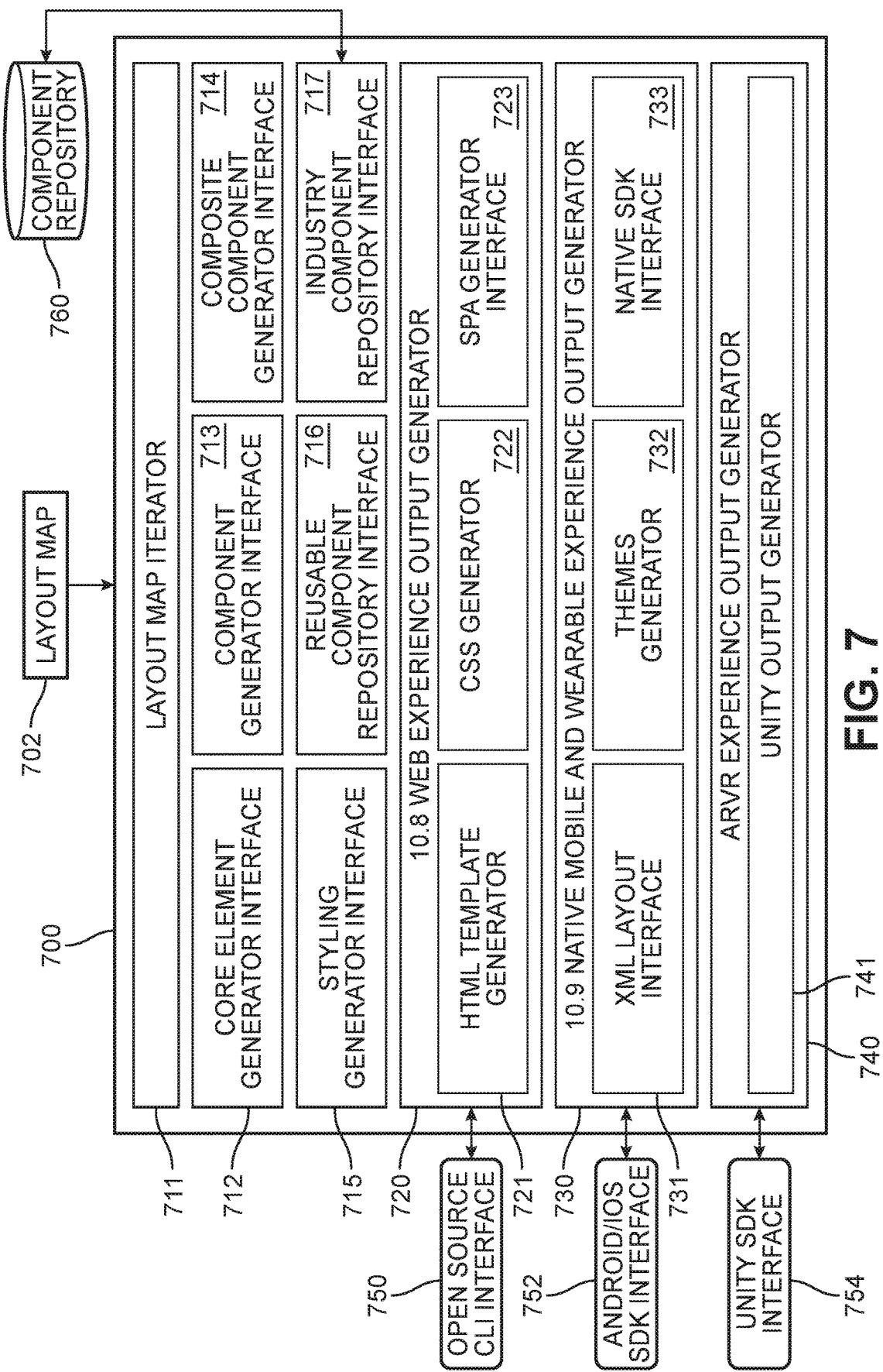
FIG. 7 is a schematic view of an output generator, according to an embodiment.

FIG. 7 is a schematic view of one embodiment of output generator 700. Output generator 700 may comprise various modules for generating the deployable code for implementing unified experiences across a variety of different digital platforms. It may be appreciated that output generator 236, shown in FIG. 2, could include some or all of the same modules and other components as output generator 700.

As shown in FIG. 7, output generator 236 may receive layout map 702 as input. Layout map 702 may comprise the target framework patterns (themselves converted from the target platform patterns) necessary to build the final layout for deployment on one or more platforms.

Information from layout map 702 is fed into a layout map iterator 711. Layout map iterator 711 iterates through each element in layout map 702. Each element may be identified according to its metadata. The elements may then be handed over to an appropriate interface for generating the output code. For example, a core element interface 712 provides the necessary code generator function definitions for the core elements. A component generator interface 713 provides the necessary code generator function definitions for components that are not already identified as reusable components or industry ready components. A composite component generator 714 interface provides the necessary code generator function definitions for the composite components that are not already identified as reusable components or industry ready components. A styling component generator interface 715 provides the necessary code generator function definitions for the styling generation of core elements, components or composite elements. A reusable component repository interface 716 provides the necessary interfaces and implementations to pull the code from the existing reusable components repository and the necessary binding to the target output code. An industry component repository interface 717 provides the necessary interfaces and implementations to pull the code from the existing industry components repository and the necessary binding to the target output code. In some cases, interface 717 may retrieve information from a component repository 760.

To generate code for different digital experiences, output generator 236 may include a web experience output generator 720, a native mobile and wearable experience output generator 730, and an AR/VR experience output generator 740. For example, web experience output generator 720 includes provisions to implement classes for various web platform components. Generator 720 may further include an HTML template generator 721 to provide the HTML template generation capabilities as per the standard W3C definitions. Generator 720 may also include a CSS generator 722 to provide the CSS styling capabilities as per the standard CSS3 specifications. Generator 720 may also include an SPA generator interface 723 to provide the necessary interfaces to integrate with existing CLI based open source tools for single page application generation and component creation such as "ng CLI", "createreactapp CLI", and "Vue CLI". In some cases, generator 720 may communicate with an open source CLI interface 750.

Native mobile and wearables experience output generator 730 may include provisions to implement classes for the various native mobile and wearable platform components. For example, generator 730 may include an XML layout interface 731 for generating native UI layouts, a themes generator 732 for applying styling to the layouts, and a native SDK interface 733 for project and component creation and for binding the XML layouts. In some cases, generator 730 may communicate with an android/ios SDK interface 752.

ARVR experience output generator 740 may include provisions to implement classes for the various ARVR scene definitions. These may have specific implementations to generate code for specific elements. Generator 740 may include a unity output generator 741, which may interface with unity based scripting toolsets for the AR/VR scene generation (for example, with a unity SDK interface 754).

Using the exemplary system and method, experience designs in the form of images or PDFs can be automatically converted into code to implement digital experiences on a variety of platforms. The system and method may therefore provide significant time savings for developers, allowing them to focus on the business logic of applications rather than building user layouts from designs.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for automatically generating code to be executed on a target digital platform, comprising:
receiving a graphical design image;
creating an HTML canvas instance for the graphical design image;
rendering the graphical design image on the HTML canvas instance to create an HTML canvas rendering having image objects;
parsing the image objects into individual pixels;
automatically generating tile sets from the individual pixels, wherein the tile sets each comprise a group of pixels having a predefined set of rows and columns;
automatically generating a tile map from the tile sets;
using a neural network to identify a feature pattern in the tile map, wherein the feature pattern is an element of a design;
using a Softmax classifier to classify the feature pattern as belonging to a class of a set of known classes; and
using the classified feature pattern to automatically generate code, wherein the code reproduces the feature pattern in the tile map on the target digital platform.

2. The method according to claim 1, wherein the neural network is a convolutional neural network.

3. The method according to claim 1, wherein generating the tile map includes iterating through the tile sets.

4. The method according to claim 1, wherein the method includes selecting a target software framework, and wherein automatically generating code includes generating code that reproduces the feature pattern in the tile map on the target platform and for the target software framework.

5. The method according to claim 1, wherein the target digital platform is a web platform.

6. The method according to claim 1, wherein the target digital platform is a mobile platform.

7. The method according to claim 1, wherein the target digital platform is an extended reality platform.

8. The method according to claim 1, wherein the target digital platform is a wearable device platform.

9. A system for automatically generating code to be executed on a target digital platform, the system comprising:
a device processor; and
a non-transitory computer readable medium storing instructions that are executable by the device processor to implement:
a canvas rendering engine that creates an HTML canvas instance and renders an input graphical design image on the HTML canvas instance to create an HTML canvas rendering having image objects;
a design parser that parses the image objects into individual pixels and automatically generates tile sets from the individual pixels, wherein the tile sets each comprise a group of individual pixels having a predefined set of rows and columns;
a pattern identification and classification module that can convert the tile sets into multiple tile maps by iterating through the tile sets, the pattern identification and classification module further comprising:
a neural network that identifies feature patterns in the tile maps;
a Softmax classifier that classifies the feature patterns identified by the neural network as belonging to a class of a set of known classes;
a platform pattern transformation module that transforms the identified feature patterns into platform specific programming objects; and
an output generator that outputs deployable code for the target digital platform, wherein the code reproduces the feature patterns on the target digital platform.

10. The system according to claim 9, further comprising a framework pattern transformation module that transforms the platform specific programming objects into framework specific programming objects.

11. The system according to claim 9, further comprising an industry pattern enhancer that selects framework specific programming elements that can be enhanced for a target industry.

12. The system according to claim 9, further comprising a feedback analyzer that overlays the reproduced feature pattern over the input graphical design image.

13. The system according to claim 9, further comprising an accessibility and disability validator that checks the code for accessibility and disability compliance.

14. The system according to claim 9, wherein the neural network includes one or more convolutional layers.

15. The system according to claim 14, wherein the neural network includes one or more pooling layers.

16. The system according to claim 15, wherein the neural network includes two or more fully connected layers.

17. The system according to claim 9, wherein the feature pattern indicates that a tile map of the multiple tile maps contains one of a title, an input label, an input box, a menu selector, and a photo.

18. The system according to claim 9, wherein the target digital platform is one of a web platform, a mobile platform, or a wearable platform.

19. The system according to claim 9, wherein the target digital platform is an extended reality platform.

20. A non-transitory computer-readable medium storing software comprising instructions executable by one or more computers which, upon such execution, cause the one or more computers to:
- receive a graphical design image;
- create an HTML canvas instance for the graphical design image;
- render the graphical design image on the HTML canvas instance to create an HTML canvas rendering having image objects;
- parse the image objects into individual pixels;
- automatically generate tile sets from the individual pixels, wherein the tile sets each comprise a group of pixels having a predefined set of rows and columns;
- automatically generate a tile map from the tile sets;
- use a neural network to identify a feature pattern in the tile map, wherein the feature pattern is an element of a design;
- use a Softmax classifier to classify the feature pattern as belonging to a class of a set of known classes; and
- use the classified feature pattern to automatically generate code, wherein the code reproduces the feature pattern in the tile map on the target digital platform.

* * * * *